United States Patent [19]

Menser et al.

[11] 4,302,710

[45] Nov. 24, 1981

[54] SUN TRACKING CONTROLLER

[75] Inventors: Howard K. Menser; Robert D. Newcomb, both of Plymouth, Ind.

[73] Assignee: Menser Industries, Plymouth, Ind.

[21] Appl. No.: 90,412

[22] Filed: Nov. 1, 1979

[51] Int. Cl.³ .............................................. G01T 1/16
[52] U.S. Cl. ...................................... 318/117; 318/306
[58] Field of Search ................................ 318/306, 117

[56] References Cited

U.S. PATENT DOCUMENTS 3,348,374 10/1967 Schalkowsky ................. 310/306 X
3,495,085  2/1970 Knight ............................ 310/306 X
3,630,020 12/1971 Chase ............................. 310/306 X Primary Examiner—Donovan F. Duggan
Attorney, Agent, or Firm—Oltsch, Knoblock & Hall

[57] ABSTRACT

An apparatus which controls the electric tracking motors of solar energy collectors and other solar devices which are adapted to be aimed at the sun.

9 Claims, 9 Drawing Figures

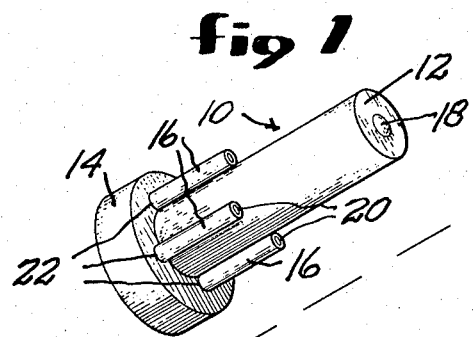
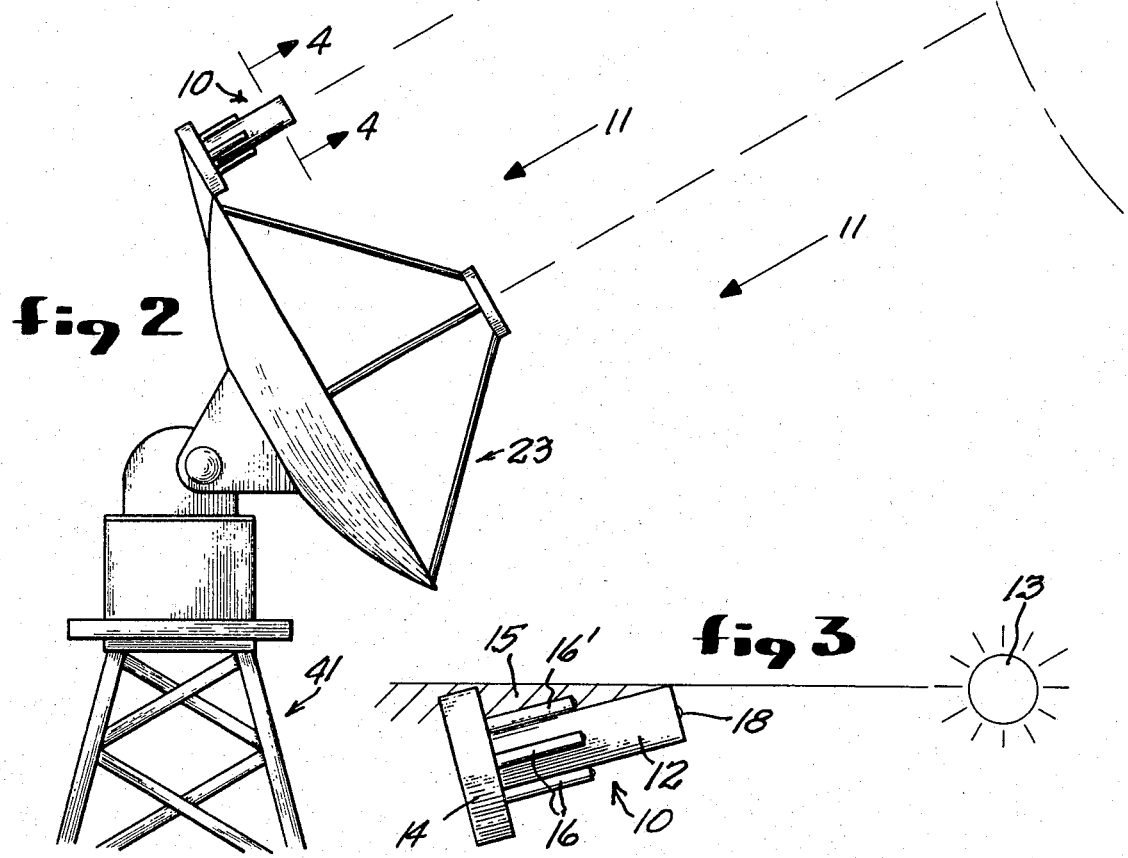
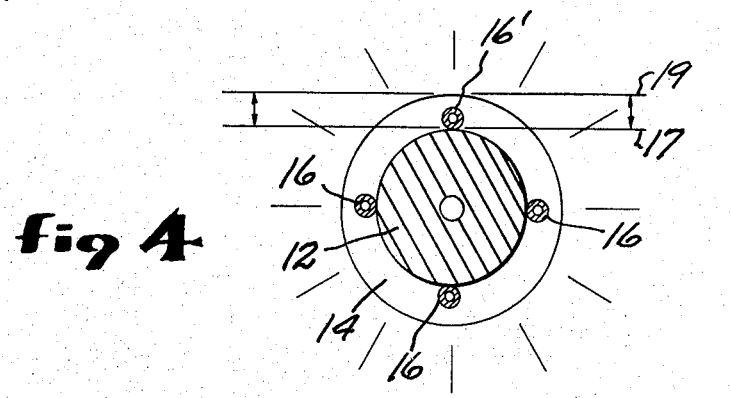

SUN TRACKING CONTROLLER

SUMMARY OF THE INVENTION

This invention relates to a control system for the electric tracking motors of a solar energy collector which is adapted to be aimed at the sun. Many solar energy collectors and other solar energy devices realize their greatest efficiency only when they are aimed directly at the sun. As a consequence, it is common to adapt these solar energy devices to be shifted to follow the movement of the sun across the daytime sky. It is also common to provide for the movement of the solar energy device by electric tracking motors so as to eliminate the need for periodic manual repositioning of the collector. When such tracking motors have been controlled by a manual switch, the need for periodic human attendance of the collector is reduced, but is not eliminated. Additionally, the control of a collector's tracking motors by a manual switch is frequently inaccurate. Consequently, an automatic tracking system in association with the solar energy collector and tracking motors is desirable to reduce the need for human attendance and to increase the accuracy of the collector's sun tracking.

As the sun moves across the daytime sky, its apparent or observed movement is generally from the eastern horizon upward across the sky and then downward in the west to set behind the western horizon. A solar energy collector which follows the sun's movement will thus be pointing generally toward the west at sundown. The collector must, therefore, be shifted after sundown to point toward the eastern horizon at dawn the next day, so that it is again oriented to receive radiant energy from the sun. Such shifting of the collector by its motors can be accomplished by manual switch means, but a human attendant is required to do so. Therefore, the inclusion of an automatic return-to-the-east feature into automatic controls for solar collectors is desirable.

In the controller of this invention, a control head is provided which has an opaque post and a base. The opaque post is attached at one end to the base and projects generally perpendicularly therefrom. A day-night detector is provided in the opaque post at its free end opposite to the base. The base of the control head is generally circular and has a diameter greater than its thickness. The opaque post is secured near the center of the base. Spaced fibre optic light conductors are attached to the base to extend substantially parallel to the opaque post and adjacent to and in similar relation to the post from the base to points intermediate the ends of the post. The light conductors are spaced apart substantially equally with each one preferably being disposed approximately 90° from the adjacent ones about the perimeter of the post. Each light conductor is adapted to receive light, sunlight for example, at its free end when properly oriented to a light source. Associated with the end of each light conductor at the base is a radiation reactive electrical device. A similar radiation reactive electrical device is also associated with the day-night detector.

The radiation reactive electrical devices are connected in electrical circuits designed to control movement of a solar energy collector by its tracking motors in response to the presence or absence of light at the free or light receiving end of the respective light conductors and at the day-night detector.

Thus, the use of this invention involves the association of a control head with a solar energy collector to position the axis of the opaque post substantially parallel to sun rays. The day-night detector will be faced in the direction from which the collector is to receive energy. One method of association is to directly attach the control head to the solar energy collector. The control head will thus be moved with the collector by its tracking motors and will control the collector to point at the sun in response to the presence or absence of radiation received by the respective light conductors of the control head.

It will be understood that where it is not desired to attach the control head directly to a solar energy collector, other means of associating the control head to the collector may be employed. For example, the control head may be attached to a gimble joint suitably connected to the control head to cause movement of the control head correlated to the movement of the solar collector. Thus, the control head may be located at some distance from the solar energy collector, yet still may be associated with the collector to remain substantially parallel thereto. Similar means may be employed to control a multiplicity of solar collectors by a single control head.

Accordingly, it is an object of this invention to provide a sun tracking controller which accomplishes a high level of sun tracking accuracy.

Another object is to provide a sun tracking controller which employs fibre optic light conductors.

Another object is to provide a sun tracking controller which employs a sun directed post which is so oriented to associated parts as to create a shadow across a radiation reactive electrical device as movement of the sun occurs which requires movement of a sun tracking apparatus.

Another object is to provide a sun tracking controller which provides a controlling function relative to both a horizontal axis and a vertical axis.

Another object is to provide a sun tracking controller which will automatically cause a solar collector controlled thereby to return to an east-facing orientation after sundown each day.

Other objects will be apparent from the following specification.

BRIEF DESCRIPTION OF THE DRAWINGS

FIG. 1 is a perspective view of the control head of this invention.

FIG. 2 illustrates the association of the control head with a solar energy collector which is aimed at the sun by the controller.

FIG. 3 is a diagramatic illustration of the control head opaque post casting a shadow across one of a plurality of light conductors of the device.

FIG. 4 is a sectional view taken along the line 4—4 of FIG. 2.

DESCRIPTION OF THE PREFERRED EMBODIMENTS

Figure 5:
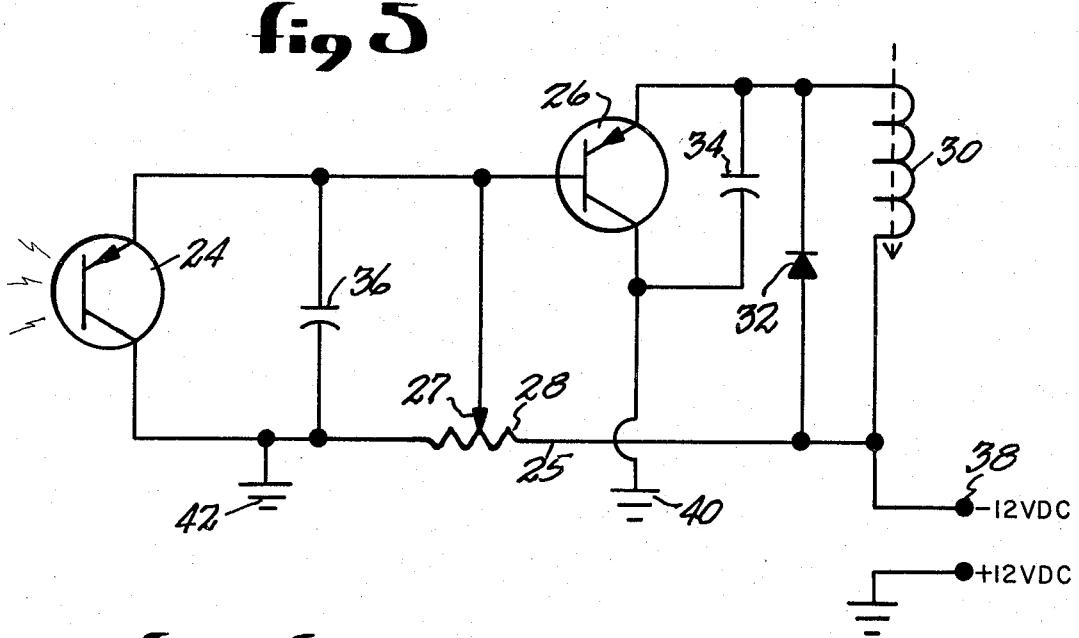
FIG. 5 is a schematic of one section of the electrical circuit which controls the solar collector tracking motors.

The preferred embodiments illustrated are not intended to be exhaustive nor to limit the invention to the precise forms disclosed. They are chosen and described to explain the principles, application, and practical use of this invention to thereby better enable others skilled in the art to utilize the invention.

With reference to FIG. 1, the controller of this invention includes a control head 10 having an elongated opaque post 12 secured at one end to a base 14. Post 12 is generally cylindrical and is attached to base 14 near the center of the base, with the axis of the post substantially perpendicular to the plane of the base. A plurality of fibre optic light conductors 16, preferably four as shown, are secured at their ends to base 14 adjacent to and extend alongside or parallel to the post 12. The light conductors 16 are spaced apart equally about the post 12. Thus as shown, four conductors 16 are spaced approximately 90° from the adjacent conductors. Each conductor 16 is elongated and extends from the base 14 to a point intermediate the length of post 12. The light conductors 16 are adapted to receive radiant energy at their free light receiving ends 20 and serve to transmit received light to their light transmitting ends 22 adjacent to base 14.

A day-night detector 18 is located at the free end of post 12 opposite from base 14. Detector 18 is adapted to receive radiant energy, as from the sun. Associated with the light transmitting end 22 of each conductor 16 and with day-night detector 18 is a radiation reactive electrical device 24, shown schematically in FIG. 5.

With reference now to FIG. 5, the controller includes one of the circuits schematically illustrated for each of conductors 16 and detector 18 for example, five circuits for controls having four conductors 16. The light reactive device 24 of each circuit is associated with one of the light conductors 16 or with the day-night detector 18. Each circuit includes a relay coil 30, a diode 32, a capacitor 34, a junction transistor 26, a potentiometer 28, a capacitor 36, a current source 38 and the radiation reactive device 24 connected as shown. Device 24 may be a phototransistor or other device reactive to light or to electro-magnetic radiation which has a lowered electrical resistance or which transmits electrical current for motor control purposes when radiation is incident thereupon. The circuits are adapted to receive electric power at the source 38 and are grounded at 40 and 42.

Figure 6:
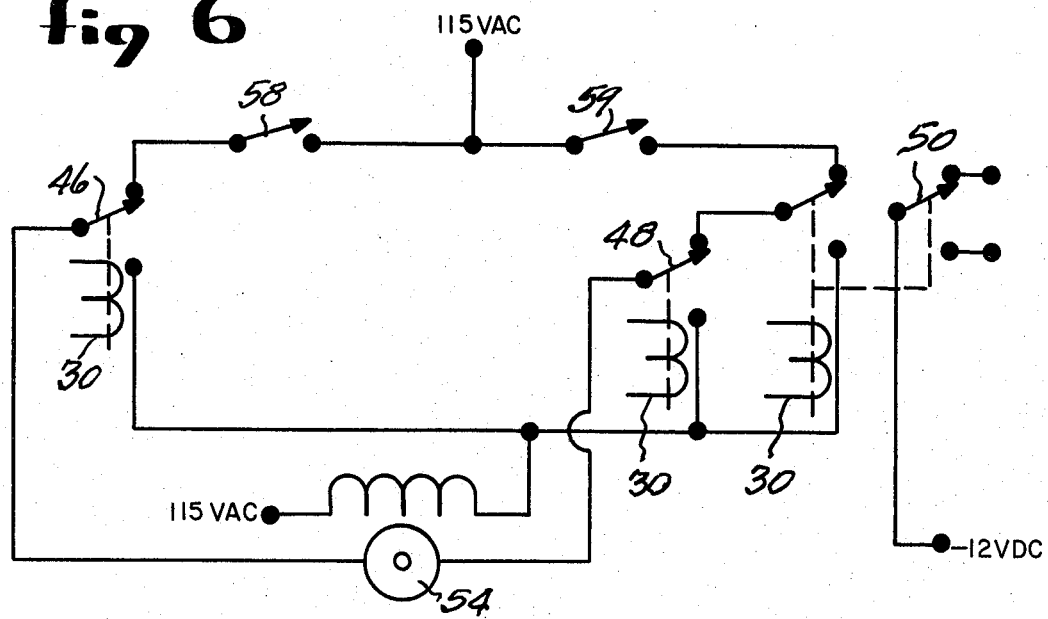
FIG. 6 is a schematic of another section of the electric circuit which controls the solar collector tracking motors.
Figure 7:
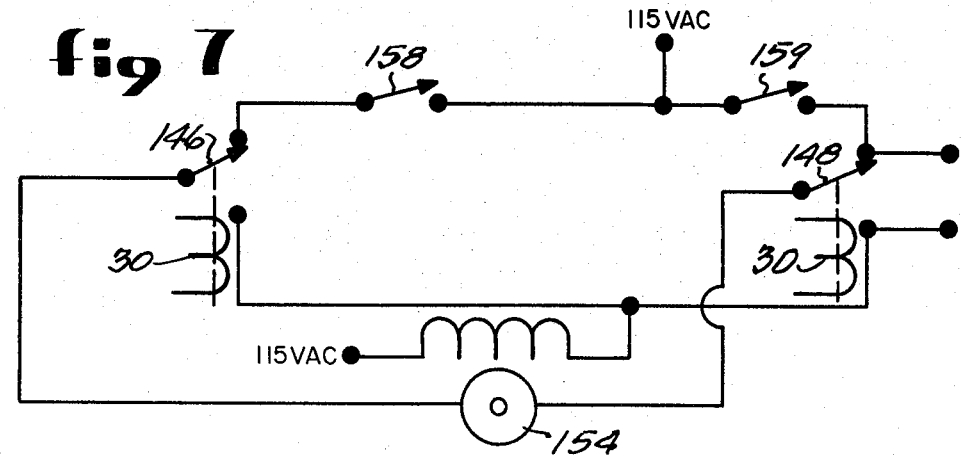
FIG. 7 is a schematic of yet another section of the electric circuit which controls the solar collector tracking motors.

Now with reference to FIGS. 6 and 7, the circuits shown in FIG. 5, are each associated through their relay coil 30 with a relay 46, 48, 50, 146, or 148 in the circuits illustrated. The day-night detector 18 is associated with relay 50. A light conductor 16 is associated with each of the relays 46, 48, 146, and 148. The circuits include limit switches 58, 59, 158, and 159. Each circuit includes one of the electric tracking motors 54 and 154.

Figure 8:
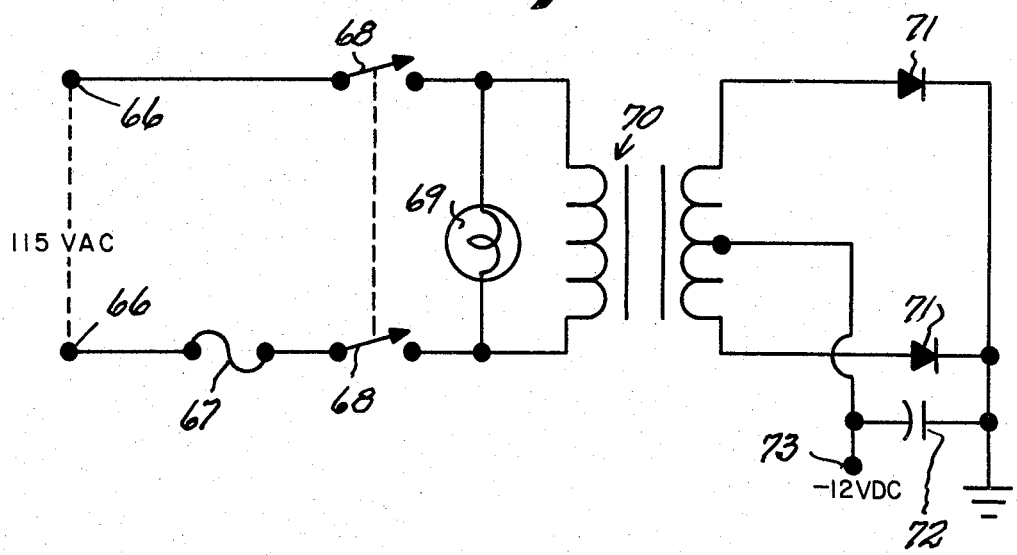
FIG. 8 is a schematic of still another section of the electric circuit which controls the solar collector tracking motors.

FIG. 8 illustrates schematically a power supply circuit. The circuit illustrated receives nominal 115 VAC electric power at its conductors 66. The circuit includes fuse 67, switch 68, pilot light 69, transformer 70, diodes 71, and capacitor 72. Nominal twelve volt D.C. electric power is delivered at conductor 73.

The controller may be associated with a solar collector 23, as viewed in FIG. 2. Collector 23 is carried by a structure or tower 41 which may set on the earth, atop a building or other structure, or in any location where solar energy is to be collected. Tower 41 has electric tracking motors 54 and 154 adapted to shift collector 23 about both a vertical axis and a horizontal axis so as to be aimed at or to track the sun 13. It is to be understood that collector 23 may be any one of several types and will have means (not shown) in association therewith for delivering the collected solar energy for use or for storage. Control head 10 may be attached directly to collector 23 and aimed at sun 13 so that light rays 11 from the sun are incident upon solar collector 23 and upon control head 10.

With reference now to FIGS. 3 and 4, wherein FIG. 4 is a section taken along the line 4—4 of FIG. 2, the head 10 is so positioned that rays from sun 13 are partially obscured by opaque post 12 of control head 10 at light conductor 16'. All light conductors 16 except conductor 16' are equally exposed to radiation from sun 13 in the position shown in FIG. 3. If the apparent motion of the sun 13, as seen in FIG. 4 is vertical from the top of the illustration toward the bottom, the sun can move only the vertical distance between horizontal lines 17 and 19 before light conductor 16' no longer receives direct solar ray illumination. When the sun 13 moves to such an extent that its rays extend below the line 17, a shadow 15 will be cast relative to the light conductor 16', as illustrated in FIG. 3. Light conductor 16' will be associated with the tracking motor of structure 41 which shifts the collector 23 about a horizontal axis. The electrical response of the circuit of FIG. 6 or FIG. 7 associated with conductor 16' will cause the tracking motor to shift or swing collector 23 downward to a position in which the conductor 16' is again illuminated and other conductors 16 are also illuminated. The top and bottom conductors 16' and 16 shown in FIG. 4 are associated with the vertical axis tracking motor. The right and left conductors 16 (at the 3 o'clock and 9 o'clock positions) are associated with the horizontal-axis tracking motor of structure 41. Thus the variations of impingement of sun rays upon the various light conductors 16 control the tracking motors 54 and 154 so as to cause the position of the solar collector 23 to be shifted to insure that collector 23 is continuously aimed at the daytime sun.

The operation of light reactive device 24 in the circuits illustrated in FIG. 5 involves change in the electrical resistance or electrical current of the device 24 in response to electro-magnetic radiation. Nominal 12 volt D.C. electrical power is supplied at conductor 38 to the circuit. Biasing voltage to be applied to the base terminal of transistor 26 is caused by the voltage drop across potentiometer 28 between points 25 and 27. Potentiometer 28 is adjusted so that when device 24 is not illuminated, transistor 26 is conductive between its emitter and collector terminals. Electrical current will thus flow from conductor 38, through relay coil 30, transistor 26, and to ground at 40. When device 24 is illuminated, its lowered resistance acts as a shunt between potentiometer point 27 and ground 42. Thus, transistor 26 is not conductive when device 24 is illuminated.

As shown in FIGS. 6 and 7, each of the relay coils 30 is associated with a relay. The relays 46 and 48 are associated with the vertical-axis tracking motor 54 and with the light conductors 16 on control head 10 in the 3 o'clock and 9 o'clock positions on the head 10. The relay 50, associated with day-night detector 18 will, when its normally open contacts are closed, cause the motor 54 to rotate collector 23 to an east-facing direction. Thus, at sundown each day the diminishing light level will cause the day-night detector to activate relay 50 and rotate the collector toward the east. A limit switch having contacts 58 will be positioned to be activated when the collector is facing east. When switch contacts 58 are opened, motor 54 will no longer rotate collector 23 toward the east. A limit switch 59 is located at a west-facing position of collector 23. Switches 58 and 59 serve a safety function to prevent unrestrained rotation of collector 23 in the event of an electrical malfunction.

The circuit illustrated in FIG. 7 is associated with the top and bottom light conductors 16 on head 10 i.e., in the 12 o'clock and 6 o'clock position as viewed in FIG. 4. Motor 154 rotates collector 23 about a horizontal axis. Switches 158, 159 are similar to switches 58 and 59. However, no return-to-the-east feature is incorporated in this circuit as was represented by the relay 50 in FIG. 6.

At sundown the collector will be pointed at the western horizon. Simply rotating the collector about a vertical axis to face east will point the collector at the eastern horizon to await the next day's rising sun. The day-night detector and relay 50 will cause the desired rotation of collector 50 to face east at sundown.

FIG. 8 illustrates schematically the power supply circuit which supplies nominal 12 V.D.C. power to the circuits shown in FIG. 5. The circuit of FIG. 8 is supplied with nominal 115 V.A.C. power at conductors 66. The secondary winding of transformer 70 is connected to diodes 71 at the opposite ends thereof. The secondary winding of transformer 70 is also center tapped. Capacitor 72 interposed in a lead between the center tap and the grounded ends of the secondary winding of the transformer serves to smooth A.C. ripple. Power from conductor 73 is supplied to the circuit illustrated in FIG. 5, associated with detector 18 and through one of the normally closed contacts of relay 50 (seen in FIG. 6) to the circuits associated with the respective light conductors 16 on control head 10.

Figure 9:
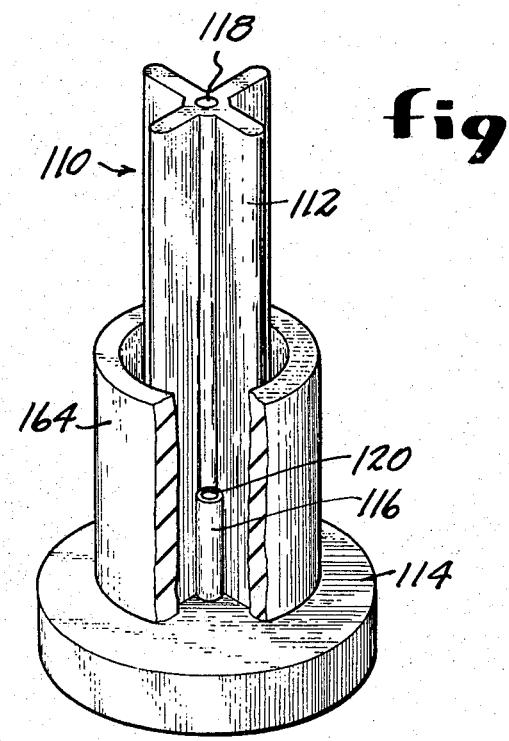
FIG. 9 is a perspective view of another embodiment of the control head.

FIG. 9 depicts another embodiment of control head 110. Post 112 is substantially "X" shaped in cross section, and light conductors 116 are located between the arms or flanges of the "X". An opaque shield ring 164 surrounds the post 112 adjacent base 114. Ring 164 shields the light receiving ends 120 of conductors 116 from ambient light and thereby increases the sun-tracking sensitivity of head 110. The arms or flanges of the "X" configured post 112 also shield the light receiving ends 120 of conductors 116 from light incident upon control head 110 which is not substantially parallel to the axis of post 112. Because most solar energy collectors which are adapted to track the sun are equipped for rotation about a vertical axis and a horizontal axis (as illustrated in FIG. 2), the apparent motion of the sun from the eastern horizon upward to the south and across the daytime sky to a point nearby overhead can result. As the sun approaches and moves through the overhead position, the horizontal axis of the collector is oriented substantially east-west. The east-west orientation of the horizontal collector axis is thus substantially parallel to the apparent motion of the sun. With the collector pointed nearly vertically and the horizontal axis substantially paralleling the path of the sun's motion, the collector cannot move to follow the sun. Without the provision of the X-shaped post 112 and ring 164 a substantial rotation of the collector about the vertical axis (i.e., approximately 90 degrees of rotation) would be required in order to bring the horizontal axis substantially perpendicular to the sun's path of motion and to allow continued sun tracking by the collector. Thus, it is readily seen that a control head having high tracking accuracy such as shown in FIG. 9 must be employed in order to detect the sun's motion and slight deviation from true overhead position and thereby provide a control signal causing the collector to rotate about its vertical axis.

It is to be understood that this invention is not to be limited to association with solar energy collectors having a horizontal and a vertical axis. For example, a collector adapted to be rotated about a polar axis, which substantially parallels the axis of the earth's rotation, and about an axis perpendicular to this polar axis does not experience the difficulty explained with regard to the control head illustrated in FIG. 9 and involving the sun in a directly-overhead position. However, collectors thus equipped nonetheless still require a high degree of sun tracking accuracy. This invention thus answers the need for a highly accurate sun tracking controller applicable to solar energy collectors of diverse types and employing different types of collector rotation designs.

Also, it will be understood that actuators for the collector need not be electrical motors, and that such actuators may be electrically controlled pneumatic or hydraulic devices or may be solenoid activated devices. Also, while the use of fiber optic members is preferred, they may be replaced by other means, such as lenses and associated photovoltaic cells positioned as described relative to a shadow producing opaque post.

We claim:

1. A sun tracking controller for use in conjunction with a solar energy collector or other solar device which is adapted to be aimed at the sun by electrically controlled actuators comprising,
   a control head exposed to receive sun rays,
   electrical means responsive to said control head and controlling said actuators for causing movement of a solar device in response to changes of the orientation of the sun from morning dawn to nightfall,
   said control head including a base,
   an opaque post supported and projecting from said base,
   a plurality of light conductors carried by said base alongside and substantially equally spaced around said post and of shorter length than said post,
   and an electromagnetic radiation responsive electrical device associated with each conductor and with said electrically controlled actuators.

2. The controller defined in claim 1 wherein said control head includes a day-night detector and a radiation responsive electrical device associated with said detector and controlling said electrically controlled actuators.

3. The controller defined in claim 1 wherein said electrical means includes a plurality of electric circuits each controlling a tracking motor to operate to shift said collector as impingement of solar rays on said control head changes.

4. The controller defined in claim 1 wherein said light conductors are of the fibre optic type.

5. The controller defined in claim 1 wherein said control head includes an opaque shield carried by said base and ring encircling and spaced from said opaque post and said light conductors.

6. The controller defined in claim 1, wherein said post includes a plurality of longitudinal flanges projecting substantially equiangularly laterally thereof and said light conductors are positioned between adjacent post flanges.

7. The controller defined in claim 5, wherein said shield ring projects from said base a distance greater than said light conductors and less than said post.

8. The controller defined in claim 1 wherein the free end of said post carries a day-night radiation responsive member, and an electrical motor control device is carried by said control head and is responsive to said day-night radiation responsive member.

9. The controller defined in claim 1, wherein four light conductors are substantially equally spaced about said post, alternate light conductors being paired, each pair controlling a different motor controlling electrical means than the other pair, said respective motors shifting said collector in different predetermined directions.

* * * * *